(12) United States Patent
Alary et al.

(10) Patent No.: US 11,225,593 B2
(45) Date of Patent: Jan. 18, 2022

(54) SINTERED PLATELET-LIKE RANDOMLY SHAPED ABRASIVE PARTICLES AND METHOD OF MAKING SAME

(71) Applicant: Center for Abrasives and Refractories Research and Development—C.A.R.R.D. Gmbh, Villach St. Magdalen (AT)

(72) Inventors: Jean-Andre Alary, L'Isle sur la Sorgue (FR); Florent Polge, Villach (AT)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/578,873

(22) PCT Filed: Jun. 3, 2016

(86) PCT No.: PCT/EP2016/062683
§ 371 (c)(1),
(2) Date: Dec. 1, 2017

(87) PCT Pub. No.: WO2016/193448
PCT Pub. Date: Dec. 8, 2016

(65) Prior Publication Data
US 2018/0163107 A1    Jun. 14, 2018

(30) Foreign Application Priority Data

Jun. 3, 2015    (DE) .......................... 10 2015 108 812

(51) Int. Cl.
*C09K 3/14*    (2006.01)
*C04B 35/119*    (2006.01)
(Continued)

(52) U.S. Cl.
CPC .......... *C09K 3/1409* (2013.01); *C04B 35/111* (2013.01); *C04B 35/119* (2013.01);
(Continued)

(58) Field of Classification Search
CPC .. C04B 35/111; C04B 35/119; C04B 35/1115; C04B 2235/3206;
(Continued)

(56) References Cited

U.S. PATENT DOCUMENTS 6,287,353 B1    9/2001    Celikkaya
2013/0067828 A1*    3/2013    Knuth ................... C04B 35/013
51/309

(Continued)

FOREIGN PATENT DOCUMENTS

CN    1180372 A    4/1998
CN    103013442 A    4/2013
(Continued)

OTHER PUBLICATIONS

International Search Report and Written Opinion dated Sep. 13, 2016, in International Application No. PCT/EP2016/062683 (10 pgs.).

*Primary Examiner* — Pegah Parvini
(74) *Attorney, Agent, or Firm* — Finnegan, Henderson, Farabow, Garrett & Dunner, LLP

(57) ABSTRACT

The present invention relates to sintered platelet-like randomly shaped abrasive particles based on alpha alumina having a hardness $H_V$ of at least 20 GPa and a crystal structure with an average crystal size between 100 nm and 300 nm, whereby the abrasive particles comprise a body having a first surface and a second surface opposite to the first surface, both surfaces are separated from each other by a randomly shaped sidewall having a thickness (T) between 20 μm and 500 μm.

13 Claims, 2 Drawing Sheets

(51) Int. Cl.
*C04B 35/111* (2006.01)
*C04B 35/624* (2006.01)
*C04B 35/626* (2006.01)
*C04B 35/64* (2006.01)

(52) U.S. Cl.
CPC ........ *C04B 35/1115* (2013.01); *C04B 35/624* (2013.01); *C04B 35/6261* (2013.01); *C04B 35/62655* (2013.01); *C04B 35/64* (2013.01); *C09K 3/1436* (2013.01); *C04B 2235/3206* (2013.01); *C04B 2235/3217* (2013.01); *C04B 2235/3225* (2013.01); *C04B 2235/3227* (2013.01); *C04B 2235/3244* (2013.01); *C04B 2235/443* (2013.01); *C04B 2235/449* (2013.01); *C04B 2235/606* (2013.01); *C04B 2235/6021* (2013.01); *C04B 2235/765* (2013.01); *C04B 2235/781* (2013.01); *C04B 2235/785* (2013.01); *C04B 2235/787* (2013.01); *C04B 2235/945* (2013.01); *C04B 2235/95* (2013.01)

(58) Field of Classification Search
CPC ...... C04B 2235/3217; C04B 2235/765; C04B 2235/781; C04B 2235/785; C04B 2235/787; C04B 2235/95; C09K 3/1436
See application file for complete search history.

(56) References Cited

U.S. PATENT DOCUMENTS

2013/0074418 A1    3/2013  Panzarella et al.
2013/0083425 A1*   4/2013  Tamaki ................ G11B 5/8404
                                                        360/75

FOREIGN PATENT DOCUMENTS

| CN | 103826802 A | 5/2014 |
| JP | 1996-502304 A | 3/1996 |
| JP | 2014 526395 A | 10/2014 |
| WO | WO 94/07969 | 4/1994 |
| WO | WO01/23323 A1 | 4/2001 |
| WO | WO 2013/049239 | 4/2013 |
| WO | WO 2014/102249 A1 | 7/2014 |

* cited by examiner

SINTERED PLATELET-LIKE RANDOMLY SHAPED ABRASIVE PARTICLES AND METHOD OF MAKING SAME

CLAIM FOR PRIORITY

This application is a U.S. national phase entry under 35 U.S.C. § 371 from PCT International Application No. PCT/EP2016/062683, filed Jun. 3, 2016, which claims the benefit of priority of DE Application No. 10 2015 108 812.6, filed Jun. 3, 2015, to both of which this application claims priority and both of which are incorporated herein by reference.

The present invention relates to sintered platelet-like randomly shaped abrasive particles, a method of their production and the use thereof.

Approximately 30 years ago a new and substantially improved type of abrasive grain based on alpha alumina, commonly referred as sol-gel derived abrasive grain, was developed and commercialized. The grinding performance of this new type of alpha alumina abrasive grain on metal, for example as measured by stock removal rate or g-ratio (quotient of stock removal and abrasive loss), was dramatically higher than that obtained by using conventional fused alumina abrasive grain.

Originally, sol-gel abrasive grains were developed as an alternative to fused microcrystalline alumina zirconia abrasive grains. Accordingly, EP 0 024 099 B1, which goes back to 1979, claims an α-aluminum oxide based granular abrasive mineral including at least 10% of zirconia, hafnia or combinations of zirconia and hafnia as a modifying component. In the following years numerous sol-gel abrasive grain patents and patent applications were published whereby the original idea of an alumina-zirconia composite was dropped, ostensibly because it was generally found that pure alumina based products or sol gel derived α-alumina based abrasive grains comprising small amounts of modifiers others than zirconia performed better than alumina zirconia sol-gel abrasive grains.

Sol-gel abrasive grains are typically prepared by dispersing an alumina monohydrate in acidified water, gelling the dispersion, drying the obtained gel, crushing the dried gel into particles, calcining the dried particles to remove the water and other volatiles, and sintering the calcined particles at a temperature far below the melting point of alumina. Frequently, one or more oxide modifiers, nucleating agents, grain growth inhibitors or other additives are additionally used in order to further improve the properties and the grinding performance of the alumina abrasive grains.

The preparation by a sol-gel process of dense, alumina-based abrasive grains is described, for example, in U.S. Pat. Nos. 4,314,827; 4,881,951 and 5,227,104. Furthermore, over the past fifteen years, numerous patents and patent applications have been published describing sol-gel derived abrasive particles based on alpha alumina having a specified shape.

U.S. Pat. No. 5,201,916 describes abrasive particles having shapes that can be characterized as thin bodies having triangular, rectangular, or other geometric shapes. Such abrasive particles are prepared by providing a dispersion comprising particles that can be converted into alpha alumina and introducing said dispersion into a mold cavity having a specified shape. After gelling and drying, abrasive grain precursor particles are formed having a predetermined size, which particles will be removed from the mold cavity and subsequently calcined and sintered.

Similarly shaped products and methods are described, for example, in U.S. Pat. Nos. 7,384,437; 8,123,828; 8,764,865; 8,142,531; 8,142,891; and 8,142,532.

The methods and products described in the above mentioned references have the disadvantage that, in order to obtain a specified shape, mold cavities having a size and shape according to the desired abrasive grain are used. However, the average particle size of the desired grains is in the range of 1 mm or less, thus, the above mentioned molding technology is in the majority of cases complex and in particular not very productive.

EP 0 318 168 B1 describes abrasive grains in the shape of platelets. The preparation of the platelets is carried out via a sol-gel process wherein, for example, the gel is shaped by extrusion into a film having a predetermined thickness, subsequently dried and crushed to form particles. The crushed particles are calcined and sintered. No mention is made of a particular crystal structure or a particular chemical composition with regard to the obtained platelet-like abrasive grains. Until now, no such abrasive grains have been found in the abrasives market although the patent dates back to the year 1987.

Triangular shaped abrasive particles with low roundness factor are disclosed in U.S. Patent Application No. 2010/0319269 A1. It is pointed out that by making the shape of the shaped abrasive particles particularly accurate, improved grinding performance occurs.

Although numerous differently shaped abrasive grains were disclosed over the past years, until now, only one sol-gel derived shaped abrasive grain product has been successfully commercialized, sold under the trade name "Cubitron II" and having a triangular shape. However, the skilled person generally attributes a high performance potential to shaped abrasive particles, thus, there is still a great demand for alternative high performance shaped abrasive grains.

Therefore, one objective of the present application is to provide good value and well performing sintered shaped abrasive particles. Another objective is to provide a method for making such α-alumina based sintered shaped abrasive particles.

Surprisingly, in line with the present invention, it was found that also platelet-like randomly shaped sintered abrasive particles based on α-alumina have superior properties for special grinding operations, provided that said particles have a very fine crystal structure with an average crystal size between 100 and 300 nm and a high hardness $H_V$ of more than 20 GPa.

In a preferred embodiment the sintered platelet-like randomly shaped abrasive particles according to the present invention have a chemical composition comprising between 1% and 20% by weight zirconia. In this case the crystal structure comprises a dominant continuous phase of α-alumina crystals and a secondary phase of substantially intergranular oriented zirconia crystals, wherein the average crystal size of the alumina and zirconia crystals is between 100 and 300 nm and wherein the crystal size of the zirconia crystals is less than 100 nm.

The sintered platelet-like randomly shaped abrasive particles generally comprise a body having a first surface and a second surface opposite the first surface whereby both surfaces are separated by a randomly shaped sidewall having a thickness (T) between 20 μm and 500 μm.

The sintered platelet-like randomly shaped abrasive particles can be effectively characterized by various grain shape factors on the basis of graphical analysis.

The circular equivalent diameter (X) is defined as the diameter of a circle with the same surface area as the particle. The circular equivalent diameter (X) can be calculated on the basis of the measured area (A) of the particle per equation (1):

$$X = \sqrt{\frac{4A}{\pi}} \qquad (1)$$

The circularity (C) is defined as the degree to which a particle is similar to a circle. The further away from a perfectly round circle that a particle becomes, the lower is the circularity value. The circularity can be calculated on basis of the measured area (A) and the perimeter (P). ISO 9276-6 (2006) defines circularity per equation (2):

$$C = \frac{4\pi A}{P^2} \qquad (2)$$

According to most of the older literature, the aspect ratio (AR) is calculated as length divided by width. The length is the maximum distance between any two points on the perimeter of the particle parallel to the major axis. The width is the maximum distance between two points on the perimeter of the particle parallel to the minor axis, whereby the major axis passes through the center of the mass of the particle corresponding to the minimum rotational energy of the shape. The minor axis passes through the center of the mass of the particle and is always perpendicular to the major axis.

The unevenness factor is calculated on the basis of the measured area (A) and the perimeter (P) of the particle per equation (3):

$$UE = \frac{\pi}{4} \frac{P^2}{A} \qquad (3)$$

Some exemplary UE-values for various geometries (i.e. a circle, a rectangle, a square, and an equilateral triangle) are summarized in the following table 1.

TABLE 1

| | | | Rectangle | | |
|---|---|---|---|---|---|
| Circle | Square | Equilateral triangle | L = 1.5 W | L = 2 W | L = 3 W |
| $d^2$~9.87 | 4d~12.57 | $3\sqrt{3}d$~16.32 | ~13.09 | ~14.13 | ~16.76 |

Another possibility for characterizing the sintered platelet-like randomly shaped abrasive particles is by using a perimeter randomness factor (PRF) which is determined by the drawing tangents of an equilateral triangle, a rectangle, or a circle along the sidewall of the perimeter of the platelet-like randomly shaped abrasive particle. The PRF (%) is calculated by dividing the missing area (M) for completing the regular geometric shape by the actual area (A) of the sintered platelet-like randomly shaped abrasive particle and multiplying by 100. The closest regular geometric shape having the smallest missing area (M) has to be used for this calculation. The measurements are carried out by using graphical analysis software or similar appropriate measurement technique. The measurement is repeated such that the perimeters of at least 50 individual platelet-like randomly shaped abrasive particles are measured whereby the average perimeter randomness factor (APRF) is determined by averaging the at least 50 individual results. An average perimeter randomness factor of 100 percent would indicate that the missing area is as large as the actual area of the measured abrasive grains.

It was found that particularly high performing grinding results could be obtained by means of platelet-like abrasive grains, when the average perimeter randomness factor was more than 15%, preferably more than 20%, and more preferably between 30% and 100%. A possible explanation for this could be that the randomly oriented rough edges of a plurality of platelets would result in an abrasive article having a rather homogeneous grinding surface with particularly numerous sharp edges, in this way generating a high stock removal rate. This explanation is substantially based on optical investigations of the abrasive articles.

Another way to describe the "randomness character" of the platelets can be practiced by studying the variance of areas or aspect ratios of each platelet-like particle compared to a specified "mold-made" abrasive particle such as an equilateral triangle as Cubitron II. The variance of areas from platelet to platelet is presented in the following table 2 together with some important grain shape factors of some selected abrasive particles. For describing the variance of areas the ANOVA program (Excel software) was used.

TABLE 2

| | abrasive grains | | | | | |
|---|---|---|---|---|---|---|
| | ZTA 2.5 | ZTA 5 | ZTA 5 cc | ZTA 10 | Cub. 321 | Cub. II |
| grain shape factor | | | | | | |
| C | 0.63 | 0.61 | 0.68 | 0.61 | 0.73 | 0.58 |
| AR | 1.74 | 1.94 | 1.58 | 1.69 | 1.54 | 1.08 |
| UE | 15.94 | 16.55 | 14.75 | 16.704 | 13.70 | 17.02 |
| X (μm) | 853 | 801 | 696 | 790 | 746 | 655 |
| APRF (%) | 34.8 | 44.5 | 32.4 | 28.9 | 26.3 | 3.3 |
| variance of areas | | | | | | |
| sum of the deviations (μm$^2$) | 692517 | 1062519 | 501266 | 1180156 | 638691 | 97022 |
| Average deviation between discrete particles (μm$^2$) | 7960 | 8781 | 3298 | 13113 | 6141 | 741 |

TABLE 2-continued

| | abrasive grains | | | | | |
|---|---|---|---|---|---|---|
| | ZTA 2.5 | ZTA 5 | ZTA 5 cc | ZTA 10 | Cub. 321 | Cub. II |
| variance ($\mu m^2$) | 192424478 | 550767550 | 26802699 | 1795831726 | 234629121 | 2040501 |
| st. dev. ($\mu m^2$) | 13872 | 23468 | 5177 | 42377 | 15318 | 1428 |
| % of st. dev. | 971 | 1643 | 362 | 2967 | 1072 | 100 |

The selected abrasive grains summarized in table 2 are platelet-like randomly shaped abrasive particles according to the below mentioned examples 7, 8, and 9 comprising 2.5% (ZTA 2.5), respectively, 5% (ZTA 5), or 10% by weight (ZTA 10) zirconia. Commercially available unshaped abrasive grains (Cub. 321) and shaped abrasive grains in form of equilateral triangles (Cub. II) are used for comparison. The chemical composition of both the latter abrasive grain types corresponds to comparative example 1. The APRF-factor of the randomly shaped abrasive grains was mostly calculated by using a rectangle as closest geometric shape, whilst in case of Cub. II an equilateral triangle was used.

It was found that particularly good results could be obtained with platelet-like randomly shaped abrasive particles according to the present invention exhibiting a certain degree of circularity and small differences between length and width. Advantageously, the typical length-to width ratio is in the range between 1.20 and 1.90, preferably between 1.40 and 1.70, more preferably below 1.60. An example for this latter type of platelet-like abrasive particle is ZTA 5 cc which is produced according to example 8, but additionally crushed and screened after sintering. A possible explanation is that after electrostatic coating, particularly homogeneous grinding surfaces are formed whereby the platelet-like abrasive particles substantially stand in upright position on the backing of the abrasive article on their sidewalls.

Particularly good grinding performances are obtained when the circularity (C) is in the range of 0.6 to 0.7. Furthermore it was found that it is beneficial if the grains have an unevenness factor (UE) between 10 and 17.

Another suitable feature for characterizing the sintered platelet-like randomly shaped abrasive particles is the length-to-thickness ratio which ranges typically from 2 to 10, preferably from 4 to 8. Also in this case it was found that, in order to be successfully applied to abrasive articles, the sintered platelet-like randomly shaped abrasive particles should have a certain degree of compactness with a corresponding length-to thickness-ratio.

In a preferred embodiment of the present invention, the randomly shaped sidewall has a thickness (T) between 150 µm and 450 µm. The average crystal size of the alumina and zirconia crystals is advantageously below 250 nm.

As far as the corresponding grain shape factors are not automatically obtained by the thickness of the predetermined gel layer and subsequent crushing, the desired ratios are adjustable by additional classifying, e.g. sieving, crushing or grain shape grading by means of a vibrating table for example.

Particle sizes and shapes were measured by means of an optical microscope STEMI SV6 (Carl Zeiss GmbH). Particle size and shape are analyzed by means of ImageJ software for calculating the respective area and perimeter of each single platelet conveniently deposited and separated when making the picture. The method is reliable and provides reproducible values.

Preferably, the chemical composition of the sol-gel derived platelet-like randomly shaped abrasive particles additionally comprises between 0.5% and 5% by weight MgO, due to the fact that a magnesium nitrate solution is usually added as crystal growth inhibitor and peptizing agent during the sol-gel process.

Furthermore, it has been found that already an amount of zirconia between 1% and 10% by weight is sufficient for obtaining high performing abrasive particles for special grinding operations. Thus, in a preferred embodiment of the present invention, the platelet-like randomly shaped abrasive particles comprise between 1% and 10% by weight zirconia.

At least 50% by weight of the zirconia, preferably 75% by weight, are present in the tetragonal modification.

In another preferred embodiment of the present invention, at least one surface is homogeneously structured and comprises structural elements, such as burling, waves, notches, teeth, saw-teeth, pyramids, cones and/or other recesses or protrusions. In this way, the bonding of the platelet-like abrasive particles in the abrasive articles, such as grinding wheels, coated abrasives and fiber discs, is improved, and their wear loss can be additionally reduced. It is self-evident that a further improvement results if both surfaces are homogeneously structured comprising the above mentioned structural elements. The structural elements may be imparted to the surface of the platelet-like randomly shaped particle by spreading the gel onto a support plate having a reverse structure before drying. The second homogeneously structured surface may be imparted by treating the surface of the spread gel film with a texturing role also featuring a reverse structure. In that case, it is evidently a precondition that the consistency of the gel is stiff enough for retaining the imparted structure during the drying process.

The method of making platelet-like randomly shaped abrasive particles comprises the steps of:
  preparing a dispersion of α-alumina hydrate in acidified water comprising α-alumina seeds having a particle size of less than 300 nm;
  gelling the dispersion by addition of aqueous solution of zirconium and magnesium salts, such as zirconium acetate and magnesium nitrate;
  forming the gel to a layer of homogeneous thickness by any convenient method such as extrusion, molding, pressing, spreading or coating;
  drying the shaped gel to obtain a platelet-like abrasive grain precursor material; crushing and screening the platelet-like abrasive grain precursor material to obtain platelet-like randomly shaped abrasive precursor particles;
  optionally calcining the abrasive grain precursor particles;
  sintering the abrasive grain precursor particles at temperatures below 1450° C. to obtain platelet-like randomly shaped abrasive particles; and
  optionally additional crushing, screening and classifying the sintered platelet-like randomly shaped abrasive particles to obtain platelet-like randomly shaped abrasive particles having an average aspect ratio (AR) less than 1.70, preferably less than 1.60.

The preparation of α-alumina seeds is one particular main important process step which is, for example, carried out by wet ball milling, starting with a fine grained α-alumina powder having a mean particle size of less than 3 μm and subsequently centrifuging the ball milled dispersion, to obtain α-alumina seeds having a particle diameter of less than 100 nm. The amount of seeds used for the production of platelet-like randomly shaped abrasive particles is typically within the range of 1% and 5% by weight, advantageously about 2% by weight, based on the weight of the abrasive particle product. In order to prepare a seeded dispersion of α-alumina hydrate in acidified water, the centrifuged seed dispersion is added to 20%-30% by weight aqueous solution of α-alumina monohydrate whereby the pH of the solution is adjusted to about 2.5 by adding a sufficient amount of nitric acid. The obtained solution is homogenized by using a high shearing homogenizer and subsequently gelled at room temperature by the addition of a salt solution comprising a sufficient amount of zirconium and magnesium salts, such as zirconium acetate and magnesium nitrate, to obtain abrasive particles having a chemical composition comprising 1%-20% by weight zirconia and 1%-5% by weight magnesium oxide. The gel is formed into a flat film having a thickness of about 800 μm-1600 μm, for example by extrusion of the gel through a die having a corresponding slotted nozzle. The flat film is dried at temperatures of around 100° C. whereby the thickness of the gel film strongly shrinks and cracks are formed. The dried material is crushed and screened to obtain platelet-like randomly shaped abrasive precursor particles. Said precursor particles are optionally calcined at a temperature between 600 and 700° C. and subsequently sintered at about 1360° C. in a rotary kiln for 20 minutes. After sintering, the sintered abrasive particles are preferably crushed once more, screened and/or classified using for example a vibrating table for obtaining platelet-like randomly shaped abrasive particles having an average aspect ratio (AR) less than 1.70, preferably less than 1.60.

Any suitable method other than extrusion, such as pressing, molding, spreading, spraying and coating, may be also used for shaping the gel.

In general, the resulting platelet-like abrasive particles have a hardness $H_V$ of more than 20 GPa, preferably more than 22 GPa, and a density of more than 97% of the theoretical density.

The character of the present invention is additionally illustrated by means of drawings which are enclosed to the description as FIGS. 1 to 4.

Figure 1:
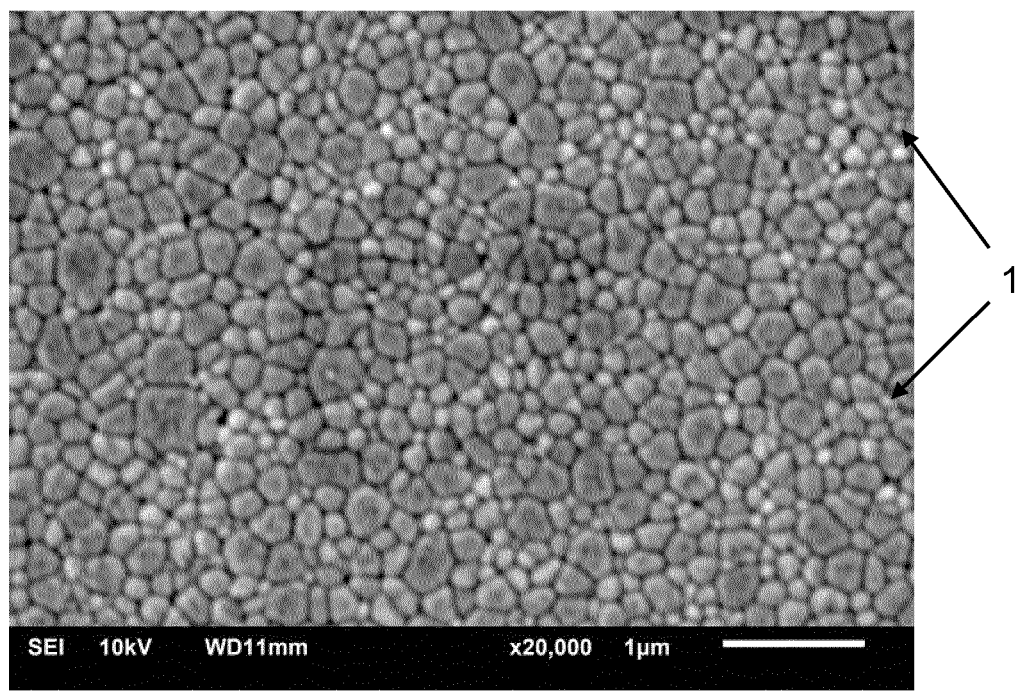
FIG. 1 shows a scanning electron micrograph of an etched polished section of a platelet-like randomly shaped abrasive particle.

FIG. 1 shows the microcrystalline crystal structure of a platelet-like randomly shaped abrasive particle comprising a dominant continuous phase of α-alumina crystals and a secondary phase of substantially intergranular oriented zirconia crystals. The chemical composition of the analyzed example comprises 2.5% by weight zirconia and 1% by weight MgO. The sample was produced by using 2% by weight α-alumina seeds having a particle size below 100 nm. The above described platelet-like abrasive particle has a hardness $H_V$ of 23.6 GPa and a density of 98.6% of theoretical density. The average crystal size is between 100 and 300 nm and the crystal size of the zirconia crystals 1 is below 100 nm.

Figure 2A:
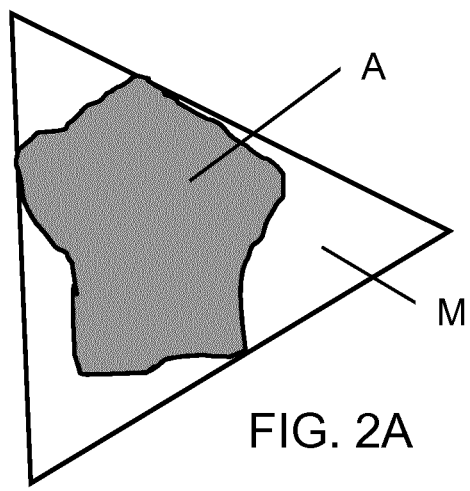
FIG. 2A illustrates the measured areas of a platelet-like randomly shaped abrasive particle by means of an equilateral triangle.
Figure 2B:
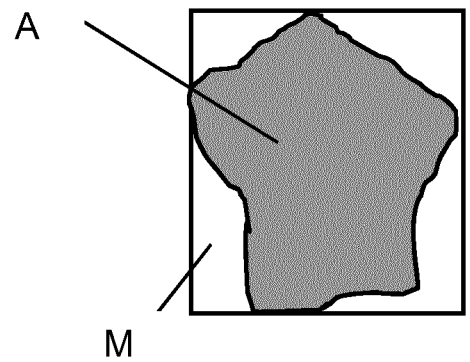
FIG. 2B illustrates the measured areas of a platelet-like randomly shaped abrasive particle by means of a rectangle.
Figure 2C:
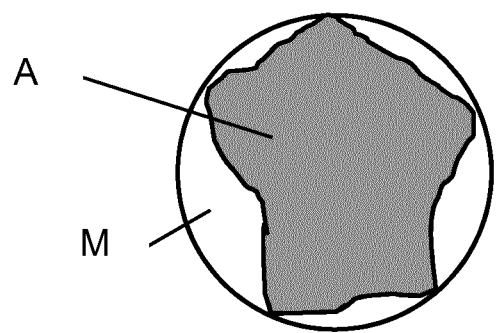
FIG. 2C illustrates the measured areas of a platelet-like randomly shaped abrasive particle by means of a circle.

FIGS. 2A to 2C illustrate the method for measuring the average perimeter randomness factor (APRF). The perimeter randomness factor (PRF) is determined by the drawing of tangents of an equilateral triangle (see FIG. 2A), a rectangle (see FIG. 2B) or a circle (see FIG. 2C) along the sidewall of the perimeter of the platelet-like randomly shaped abrasive particle. The PRF (%) is calculated by dividing the missing area (M) (for completing the selected regular geometric shape) by the actual area (A) and subsequently multiplying by 100. The measurement is repeated such that the perimeters of 50 individual platelet-like randomly shaped abrasive particles are measured whereby the average perimeter randomness factor (APRF) is determined by averaging the 50 individual results. The closest regular geometric shape should be used for this calculation. Thus, for a platelet-like randomly shaped abrasive particle having a perimeter according to FIGS. 2A to 2C a circle or a rectangle should be used.

Figure 3A:
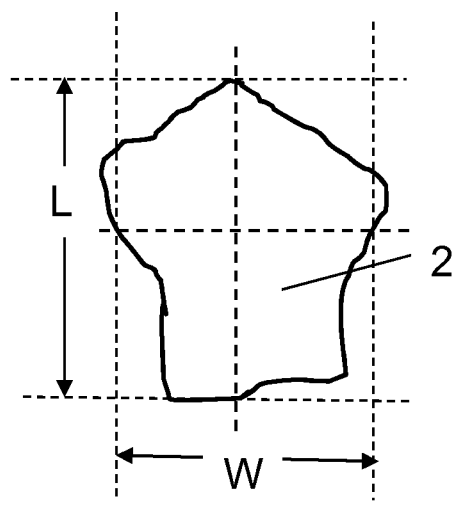
FIG. 3A shows a plan view of the platelet-like randomly shaped abrasive particle according to FIGS. 2A-2C.

FIG. 3A shows a plan view of the platelet-like randomly shaped abrasive particle according to FIGS. 2A to 2C. The length (L) is the maximum distance between any two points on the perimeter of the particle parallel to the major axis. The width (W) is the maximum distance between two points on the perimeter of the particle parallel to the minor axis, whereby the major axis passes through the center the center of the mass of the particle corresponding to the minimum rotational energy of the shape. The minor axis passes through the center of the mass of the particle and is always perpendicular to the major axis.

Figure 3B:
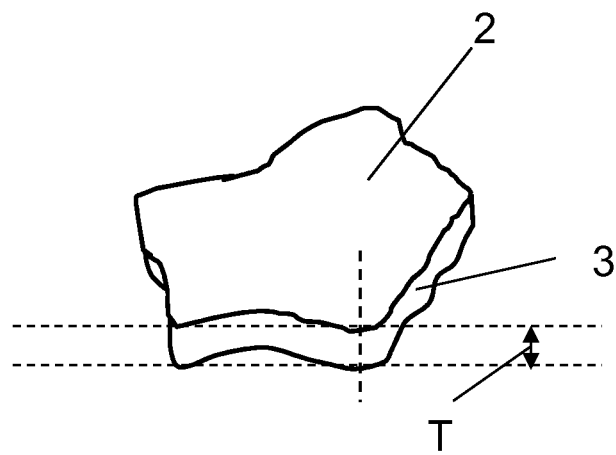
FIG. 3B shows a perspective view of the platelet-like randomly shaped abrasive particle according to FIGS. 2A-2C.

FIG. 3B shows a perspective view of the platelet-like randomly shaped abrasive particle according to FIGS. 2A to 2C. The platelet-like randomly shaped abrasive particle comprises a body having a first surface 2 and a second surface opposite to the first surface 2 both surfaces are separated by a randomly shaped sidewall 3 having a thickness (T) between 20 μm and 500 μm.

Figure 4:
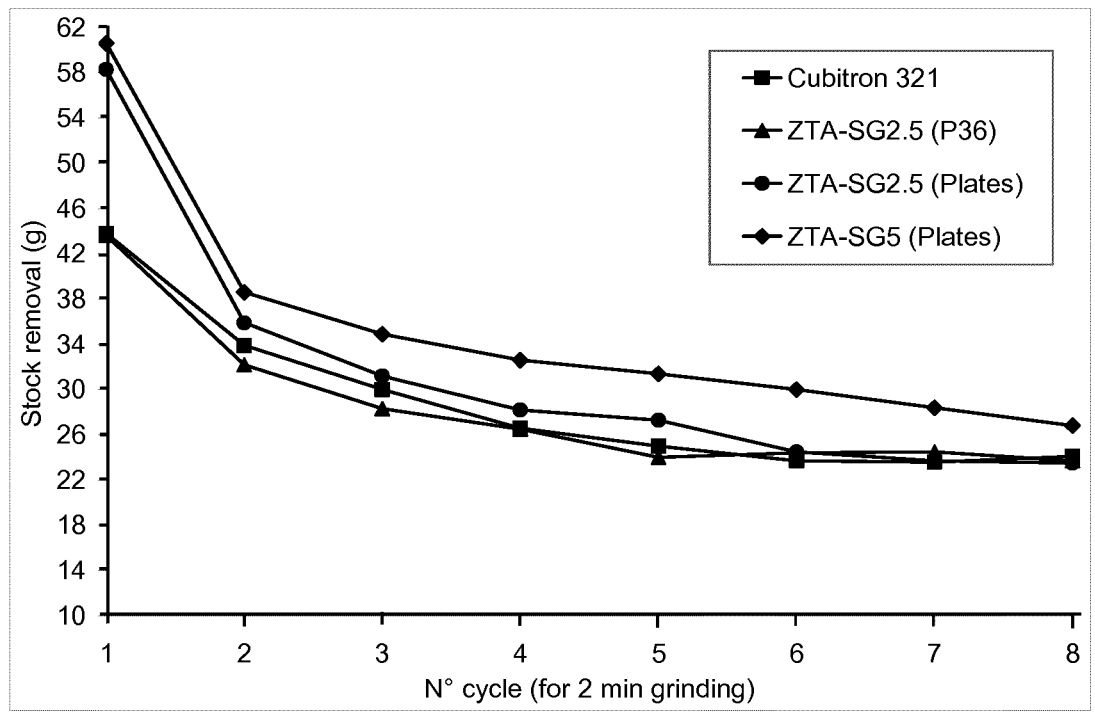
FIG. 4 illustrates a graph comparing grinding performances of platelet-like randomly shaped abrasive particles to prior art abrasive particles.

FIG. 4 is a graphical illustration of some selected grinding tests of platelet-like randomly shaped abrasive particles in comparison with unshaped abrasive grains. FIG. 4 is described in more detail within the description of the following grinding tests.

This invention is further illustrated by the following examples, but the particular materials and amounts thereof recited in the examples, as well as other conditions and details, should not be construed to unduly limit this invention.

EXAMPLE 1 (COMPARATIVE EXAMPLE)

Comparative example 1 was produced according to the teaching of U.S. Pat. No. 4,881,951 by means of the impregnation method using about 2% by weight $La_2O_3$, 1% by weight $Y_2O_3$, and 1% by weight MgO as modifying agents. The resulting abrasive grain corresponds to the commercially available sol-gel derived abrasive grain having the trade name "Cubitron 321"

EXAMPLE 2 (COMPARATIVE EXAMPLE)

A dispersion with about 30% by weight solids content was made by mixing alpha aluminum oxide monohydrate powder together with 2% by weight alpha aluminum oxide seeds, based on the total weight of the desired product, in a solution containing water and concentrated nitric acid (70%), whereby the pH was adjusted to 2.5. The resulting sol was mixed with 1% by weight equivalent oxide of magnesium nitrate and 2.5% by weight equivalent oxide of zirconium acetate as modifying component, each based on the weight of the desired product. Gelling occurs at room temperature after the addition of zirconium acetate and magnesium nitrate. The gel was dried at about 100° C. to obtain abrasive particles precursor material which was crushed to reduce the particle size slightly larger to that desired for the abrasive particles and subsequently screened. The screened abrasive particle precursors were sintered for 20 minutes at about 1360° C. in a rotary kiln to obtain abrasive particles. After sintering, the abrasive particles were finally screened to obtain grit P36 according to FEPA.

EXAMPLES 3-6 (COMPARATIVE EXAMPLES)

Examples 3-6 were produced according to comparative example 2 except that 5% by weight (example 3), 10% by weight (example 4), 15% by weight (example 5) or 20% by weight (example 6) equivalent oxide of zirconium acetate were used as modifying component.

EXAMPLE 7 (INVENTION)

A dispersion with about 30% by weight solids content was made by mixing alpha aluminum oxide monohydrate powder together with 2% by weight alpha aluminum oxide seeds, based on the total weight of the desired product, in a solution containing water and concentrated nitric acid (70%), whereby the pH was adjusted to 2.5. The resulting sol was mixed with 1% by weight equivalent oxide of magnesium nitrate and 2.5% by weight equivalent oxide of zirconium acetate, each based on the weight of the desired product. Gelling occurred at room temperature after the addition of zirconium acetate and magnesium nitrate. The gel was extruded onto a support plate by means of a die having a rectangular nozzle of about 1.5 mm thickness and 3 cm length to obtain a film. The shaped gel was dried at about 100° C. to obtain platelet-like abrasive particles precursor material which was crushed to reduce the particle size slightly larger to that desired for the abrasive particles and subsequently screened. The screened abrasive particle precursors were sintered for 20 minutes at about 1360° C. in a rotary kiln to obtain platelet-like randomly shaped abrasive particles. After sintering the shaped abrasive particles were finally screened to obtain grit P36 according to FEPA.

The sintered platelet-like randomly shaped abrasive particles have a Vickers-hardness $H_V$ of 23.6 GPa, a density of 98.6% of theoretical density, and a crystal structure with an average crystal size of 170 nm. The particles have an average length of about 1080 μm, an average width of 620 μm, and an average thickness of about 180 μm.

EXAMPLES 8 AND 9 (INVENTION)

Examples 8 and 9 were produced according to example 7 except that 5% by weight (example 8) and 10% by weight (example 9) equivalent oxide of zirconium acetate were used as modifying component.

EXAMPLE 10 (GRINDING TEST/250 MM FIBER DISCS)

Fiber discs were produced by electrostatically coating about 40 g abrasive particles onto a vulcanized fiber paper coated with about 5 g resinoid make coat by means of an electrostatic grain coating machine (Peter Schwabe GmbH) applying an electrostatic field of 22 to 35 kV for 6 to 10 seconds. The coated abrasive fiber discs were cured for 6 hours at 100° C. and subsequently coated with about 35 g size coat and finally cured for 12 hours at 140° C.

The tests were carried out using grit P36 according to the following sieving analysis:

TABLE 3

| grit P36 | | | |
|---|---|---|---|
| sieve | No. | μm | % |
| 1 | 18 | 1000 | 0 |
| 1 + 2 | 25 | 710 | <1 |
| 1 to 3 | 30 | 600 | 10-18 |
| 1 to 4 | 35 | 500 | 52-70 |
| 1 to 5 | 40 | 425 | >92 |
| pass through 5 | 40 | 425 | <8 |

The workpiece, a Cr—Ni stainless steel bar (1.4571) having a diameter of 20 mm, was applied to the fiber disc running at 2000 rpm with a pressure of 40 N, respectively 60 N. The test measured the weight loss of the work piece after each 2 minute cycle. Each test run comprised a total of 8 grinding cycles each interrupted with 2 minutes cooling period. After the test run, the weight loss of the fiber disc was additionally determined.

TABLE 4

| example | average crystal size (nm) | hardness HV (GPa) | grinding test (40 N) stock removal (g) | grinding test (40 N) g-ratio (%) | grinding test (60 N) stock removal (g) | grinding test (60 N) g-ratio (%) |
|---|---|---|---|---|---|---|
| 1 (comparison) | 250 | 20.2 | 137.6 | 100 | 230.7 | 100 |
| 2 (comparison) | 170 | 21.9 | 145.9 | 104 | 227.2 | 106 |
| 3 (comparison) | 175 | 22.4 | 126.2 | 92 | 220.1 | 103 |
| 4 (comparison) | 175 | 23.8 | 131.4 | 98 | 212.6 | 102 |
| 5 (comparison) | 140 | 24.4 | 128.5 | 92 | 209.3 | 98 |
| 6 (comparison) | 200 | 20.9 | 124.4 | 87 | 198.4 | 89 |
| 7 (invention) | 170 | 23.6 | 151.6 | 117 | 252.6 | 125 |
| 8 (invention) | 190 | 23.2 | 148.0 | 118 | 283.3 | 142 |
| 9 (invention) | 145 | 22.2 | 135.5 | 102 | 252.1 | 121 |

A graphical representation of the grinding tests of some selected examples (1, 2, 7, and 8) is reproduced in FIG. 4. Comparative example 1 is referred to as Cubitron 321. Comparative example 2 is a sol-gel abrasive grain doped with 2.5% by weight zirconia having the designation ZTA-SG2.5. Example 7, a platelet-like abrasive particle according to the present invention having the same chemical composition as example 2, is referred to as ZTA-SG2.5 (Plates). Example 8, an abrasive particle according to the present invention doped with 5% by weight zirconia, is referred to as ZTA-SG5 (Plates).

The g-ratio is calculated according to equation (4), whereby a direct reference to comparative example 1 is made:

$$g\text{-ratio} = 100 \times \frac{\text{stock removal (ZTA)} \times \text{abrasive loss (Cubitron)}}{\text{abrasive loss (ZTA)} \times \text{stock removal (Cubitron)}} \quad (4)$$

The graph clearly demonstrates that, particularly during the first grinding cycle, both platelet-like randomly shaped examples 7 and 8 exhibit a significantly higher stock removal rate than the unshaped particles, whereby example 8 doped with 5% by weight zirconia remains on a high level during the whole test run. Another advantage is that for all zirconia doped particles the measured abrasive loss is less than for the comparative example 1, in particular at high pressure conditions, thus, example 8 revealing a g-ratio of 142% resulting in an increased grinding performance of 42%.

The invention claimed is:

1. Sintered abrasive particles comprising a platelet-like body having a first surface and a second surface opposite to the first surface, wherein
   the first and second surfaces are separated by a randomly shaped sidewall having a thickness (T) between 20 μm and 500 μm,
   the abrasive particles have a crystal structure with an average crystal size between 100 and 300 nm,
   the crystal structure comprises α-alumina crystals and zirconia crystals, the abrasive particles have a chemical composition comprising between 1% and 20% by weight zirconia,
   at least 50% by weight of the zirconia is present in the tetragonal modification,
   the crystal structure comprises a dominant continuous phase of α-alumina crystals and a secondary phase of intergranular oriented zirconia crystals, and the crystal size of the zirconia crystals is less than 100 nm.

2. The abrasive particles of claim 1, wherein the chemical composition additionally comprises between 0.5% and 5% by weight MgO.

3. The abrasive particles of claim 1, wherein the chemical composition comprises between 1% and 10% by weight zirconia.

4. The abrasive particles of claim 1, wherein at least 75% by weight of the zirconia is present in the tetragonal modification.

5. The abrasive particles of claim 1,
   wherein the average crystal size of the alumina and zirconia crystals is below 250 nm.

6. The abrasive particles of claim 1,
   wherein the abrasive particles have a circularity (C) of more than 0.60.

7. The abrasive particles of claim 1,
   wherein the abrasive particles have an unevenness factor (UE) between 10 and 17.

8. The abrasive particles of claim 1,
   wherein the abrasive particles have an average perimeter randomness factor (APRF) of more than 15%.

9. The abrasive particles of claim 1,
   wherein the randomly shaped sidewall has a thickness (T) between 100 μm and 450 μm.

10. The abrasive particles of claim 1,
    wherein the abrasive particles have an aspect ratio (AR) between 1.20 and 1.90.

11. The abrasive particles of claim 1, wherein the abrasive particles have an aspect ratio of less than 1.60.

12. The abrasive particles of claim 1,
    wherein the abrasive particles have a length-to-thickness ratio ranging from 2 to 10.

13. The abrasive particles of claim 1, wherein at least one surface is homogeneously structured with structural elements, such as knobs, waves, teeth, saw-teeth, pyramids, cones and/or other indentations or protuberances.

* * * * *